United States Patent [19]
Amin et al.

[11] Patent Number: 5,444,116
[45] Date of Patent: Aug. 22, 1995

[54] PERFLUOROELASTOMERIC COMPOSITIONS AND SEALS HAVING IMPROVED CHEMICAL RESISTANCE AND METHODS OF MAKING THE SAME

[75] Inventors: Harshad P. Amin, West Point, Pa.; Carl A. Aufdermarsh, West University Place, Tex.

[73] Assignee: Greene, Tweed & Co., Kulpsville, Pa.

[21] Appl. No.: 92,144

[22] Filed: Jul. 14, 1993

[51] Int. Cl.$^6$ .................... C08K 3/04; C08L 27/12
[52] U.S. Cl. .................... 524/495; 524/496; 524/462; 524/492; 524/520; 524/545; 525/199
[58] Field of Search ............ 524/495, 496, 462, 492, 524/445, 520, 545, 456, 423; 525/199, 200

[56] References Cited

U.S. PATENT DOCUMENTS

| | | | |
|---|---|---|---|
| 2,789,960 | 4/1957 | Smith | 260/45.5 |
| 3,030,260 | 4/1962 | Metzler et al. | 156/305 |
| 3,851,018 | 11/1974 | Kelly | 260/900 |
| 4,387,168 | 6/1983 | Morita | 521/54 |
| 4,503,171 | 3/1985 | Stewart | 524/544 |
| 4,548,960 | 10/1985 | Bentley | 523/176 |
| 4,713,418 | 12/1987 | Logothetis et al. | 525/200 |
| 4,914,158 | 4/1990 | Yoshimura et al. | 525/199 |
| 4,952,630 | 8/1990 | Morgan et al. | 525/72 |
| 5,010,130 | 4/1991 | Chapman, Jr. et al. | 524/445 |
| 5,051,479 | 9/1991 | Logothetis et al. | 525/197 |
| 5,057,345 | 10/1991 | Barrett | 428/35.1 |

OTHER PUBLICATIONS

R. Morgan et al., "Reinforcement of Elastomers with Fluoroplastic Additives", E. I. Du Pont de Nemours & Co. presentation to the Energy Rubber Group in Arlington, Tex. (Jan. 16, 1991) originally presented at a meeting of the Rubber Division of the American Chemical Society in Washington, D.C. (Oct. 12, 1990).

Primary Examiner—Paul R. Michl
Assistant Examiner—La Vonda R. DeWitt
Attorney, Agent, or Firm—Panitch Schwarze Jacobs & Nadel

[57] ABSTRACT

An elastomeric composition having improved resistance to chemical attack is provided, the elastomeric composition including a perfluoroelastomer and a non-fibrillating particulate fluorographite. Also, a process for improving the processibility and resistance to chemical attack of a perfluoroelastomer is provided, in which the perfluoroelastomer is mixed with a non-fibrillating fluorocarbon particulate polymer to form a elastomeric composition which is processed at a temperature less than the melting temperature of the non-fibrillating fluorocarbon particulate polymer to disperse the fluorocarbon polymer throughout the perfluoroelastomer while maintaining the fluorocarbon polymer in particulate form.

17 Claims, 2 Drawing Sheets

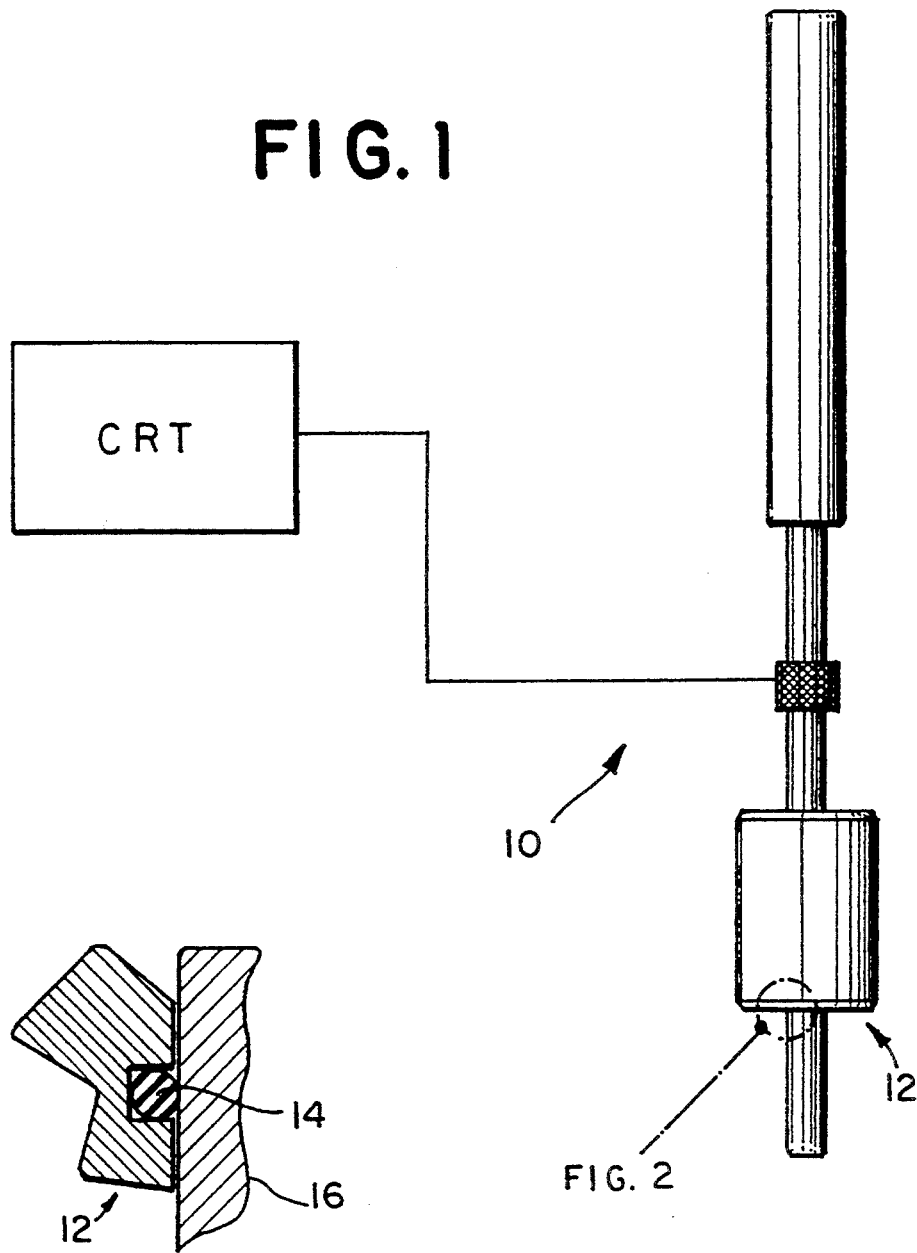

PERFLUOROELASTOMERIC COMPOSITIONS AND SEALS HAVING IMPROVED CHEMICAL RESISTANCE AND METHODS OF MAKING THE SAME

FIELD OF THE INVENTION

This invention relates to improving the chemical resistance of perfluoroelastomeric compositions and seals.

BACKGROUND OF THE INVENTION

Elastomers may be used in a variety of processing and manufacturing operations which demand resilience and resistance to high temperatures and chemical attack. For example, elastomeric seals may be used in chemical processing and petroleum refining equipment, such as pump housings, reactors, mixers, compressor casings, valves and other equipment. Elastomeric seals are also used in the semiconductor manufacturing industry, often in the presence of aggressive chemicals and specialty gases. In the nuclear power industry, such seals may be used in check valves and pressure relief valves where superior reliability is required. In analytic and process instrument applications, such as liquid chromatography, microcontamination is often unacceptable and seals or gaskets must possess superior resistance to degradation when subjected to chemical attack. Chemical and temperature resistant elastomeric seals are also required in the aircraft and aerospace industries, chemical transport industries, and paint and coating operations, to name a few.

Such seals may be located within complex machinery and process systems, making replacement of failed seals a costly and arduous task. Most elastomeric seal failures are caused by thermal aging and fluid attack. The polymers may degrade by oxidation, chemical attack, breaking of the polymer chain, etc. Swelling may cause the seal to expand out of its retaining grooves and cause leaks in a system. Generally, higher temperatures increase the deteriorative effect of chemicals on polymers. Thermal aging, including temperatures caused by peak loading conditions of equipment, may cause elastomers to become hard and brittle, decreasing the ability of seals to conform to irregular surfaces. In addition, there is evidence that the presence of oxygen may deteriorate some elastomers subjected to temperatures greater than 200° F.

The prior art discloses a variety of modified fluoroelastomeric materials having various improved physical properties. For example, U.S. Pat. No. 4,387,168, discloses an adhesive composition comprising a low molecular weight fluorine-containing elastomer and fibrillated polytetrafluoroethylene (PTFE) which has improved chemical and weather resistance. Examples of suitable elastomers include copolymers of vinylidene fluoride and at least one fluorine-containing ethylenically unsaturated monomer, such as tetrafluoroethylene (TFE), trifluorochloroethylene, trifluoroethylene, hexafluoropropylene (HFP), pentafluoropropylene, perfluoro(methyl vinyl ether), perfluoro(ethyl vinyl ether) and perfluoro(propyl vinyl ether). A conventional filler such as silica may be included as an additive in the composition.

The use of a fibrillated filler such as fibrillated PTFE is not desirable, however, because the fibrillated filler is deleterious to processibility, hindering milling, mixing, extrusion, and mold flow. Articles formed from elastomeric compositions including fibrillated fillers may be stiff and have high modulus and die swell values. Articles produced by extruding compositions containing a fibrillating filler typically have poor surface characteristics, such as gaps, cracks, etc. The preform cross-section is usually non-uniform causing uneven surfaces in the final article. Smooth surface characteristics are particularly important for articles to be used as seals to prevent leakage around the seal area.

U.S. Pat. No. 5,057,345, discloses a polymer blend comprising (A) a fluorinated ethylene-propylene copolymer and (B) a fluoroelastomer. The fluoroelastomer comprises a block copolymer having at least one elastomeric segment comprising TFE, vinylidene fluoride and HFP repeating units and at least one nonelastomeric segment comprising TIE and ethylene repeating units. The advantages of these blends include high tensile strength or elongation, low modulus, increased flexibility, improved stress-crack resistance, stress-induced crystallization and/or optical clarity.

U.S. Pat. No. 4,952,630, discloses a dispersion-process-produced, non-melt-processible, particulate, core-shell, TFE copolymer which may be compositioned with an elastomer or plastic. The PTFE resins comprise recurring units of TFE and modifying recurring units of at least one ethylenically unsaturated comonomer that is copolymerizable with the TFE in a dispersion process. Preferred comonomers include HFP and perfluoro(alkyl vinyl ethers). The comonomer may be present throughout the copolymer article, if desired, for example in the core as well as in the shell. The TFE copolymer may be incorporated in an elastomeric or a plastic organic resin. The resulting elastomeric blends have improved tear strength and abrasion resistance. The resulting plastic blends have improved extrusion properties, rate, abrasion resistance, flame resistance and less melt-swell. The elastomer matrix may be any elastomer including, but not limited to, vinylidene fluoride copolymers. The elastomeric or plastic matrix can contain fillers, such as reinforcing agents or fire retarding agents.

R. Morgan et al., "Reinforcement of Elastomers With Fluoroplastic Additives", E. I. du Pont de Nemours & Co. presentation to the Energy Rubber Group in Arlington, Tex. (Jan. 16, 1991) (originally presented at a meeting of the Rubber Division of the American Chemical Society in Washington, D.C. (Oct. 12, 1990)) discloses that elastomers compositioned with a high molecular weight TFE/HFP fluoroplastic micropowder (Teflon ® MP1500, available from E. I. du Pont de Nemours of Wilmington, Del.) improves the tear strength and abrasion resistance and reduces the coefficients of friction of elastomers. The micropowder forms short fibers, ribbons or platelets when compositioned with sufficient shear into elastomers.

U.S. Pat. No. 4,713,418, discloses blending a thermoplastic TFE copolymer with a fluoroelastomer at a temperature which is sufficiently high to melt the thermoplastic TFE copolymer. Suitable fluoroelastomers include copolymers of 52 to 79.9 mole percent TFE, 20 to 45 mole percent perfluoro(alkyl vinyl ethers) and a third comonomer which can act as a crosslink site. Carbon black may be added to the blend to improve the strength of articles formed from the blend.

Such prior art fluoroelastomeric materials may deteriorate when exposed to heat and harsh chemical environments, such as hot aromatics, oils, heat transfer fluids, amines, corrosive acids and steam, typically found in the chemical processing and other high technology industries. For example, fluoroelastomeric seals are vulnerable to attack from methyl ethyl ketone ("MEK"), diethylamine, aqueous ammonia, glacial acetic acid and other agents.

There is a long-felt need in the art for a process or method for making fluoroelastomeric compositions and seals reinforced with a non-fibrillating filler other than carbon black which may be used to form articles, such as seals, which resist deterioration when exposed to harsh chemical environments and function over a broad spectrum of temperatures from well below freezing to in excess of 450° F. without deteriorating, creeping or flowing. Preferably, such compositions and seals would combine the sealing ability of elastomers with superior chemical resistance over a wide range of temperatures.

SUMMARY OF THE INVENTION

Briefly stated, one aspect of the present invention is an elastomeric composition having improved resistance to chemical attack, the elastomeric composition comprising a mixture (blend) of a perfluoroelastomer and a non-fibrillating particulate fluorinated graphite.

Yet another aspect of the present invention is a seal made from the elastomeric composition for preventing the leakage of a fluid between a first member and a second member and having improved chemical resistance to the fluid and reduced coefficients of friction at a surface of the seal.

Another aspect of the present invention is a process for improving the resistance to chemical attack and processibility of a perfluoroelastomer. The perfluoroelastomer is mixed with a non-fibrillating fluorocarbon particulate polymer to form an elastomeric composition. The elastomeric composition is processed at a temperature less than the melting temperature of the non-fibrillating fluorocarbon particulate polymer to disperse the fluorocarbon polymer throughout the elastomeric composition while maintaining the fluorocarbon polymer in particulate form.

Yet another aspect of the present invention is a method for increasing the resistance to chemical attack of an elastomeric seal made from a perfluoroelastomer and a non-fibrillating fluorocarbon particulate polymer and decreasing the coefficients of friction at a surface of the seal.

BRIEF DESCRIPTION OF THE DRAWINGS

The foregoing summary, as well as the detailed description of the preferred embodiments, will be better understood when read in conjunction with the appended drawings. For the purpose of illustrating the present invention, there are shown in the drawings several embodiments which are presently preferred, it being understood, however, that the invention is not limited to the specific arrangements and instrumentalities disclosed. In the drawings:

FIG. 1 is a schematic diagram of a breakaway and dynamic friction testing apparatus used to determine the breakaway and dynamic friction values of O-ring seals produced according to the method of the present invention;

FIG. 2 is an enlarged detailed cross-sectional view of a portion of the testing apparatus of FIG. 1;

DETAILED DESCRIPTION OF PREFERRED EMBODIMENTS

Figure 3:
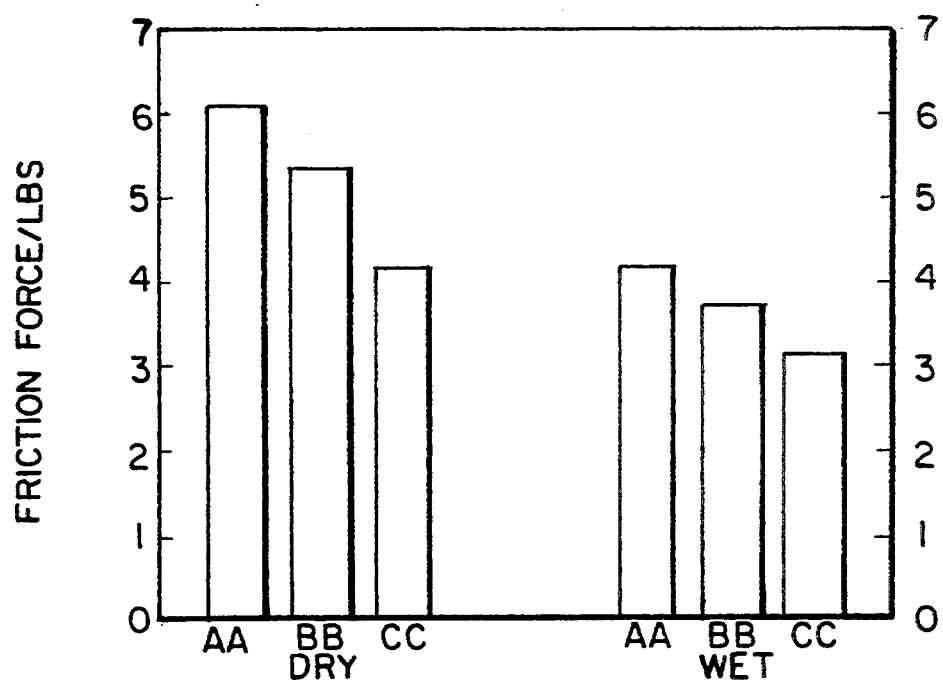
FIG. 3 is a graph of dynamic friction values of O-ring seals produced according to the method of the present invention.

The compositions of the present invention will now be discussed generally in the context of their use as elastomeric seals. However, the compositions of the present invention are not limited only to use as elastomeric seals, but are also useful for other articles or applications in which improved resistance to chemical attack is desired, such as coatings, laminates, gaskets, tubing, molding articles, etc.

Seals to which the present invention are particularly directed include those for preventing the leakage of a fluid between a first member and a second member, such as a valve bonnet and valve body, a gasket between two flanges, and a rotating shaft and stationary housing, for example. Further discussion of the first and second member is not believed to be necessary to an understanding of the present invention and will therefore be omitted.

The seal is preferably formed in the shape of an O-ring, although the seal may also be formed in the shape of a V-ring, U-cup, gasket, valve seat, tubing, "down hole" packing element, or other sealing parts, including those of custom design. One of ordinary skill in the art would understand that the seal may be formed in any desired shape.

Seals are typically designed to prevent the leakage of a fluid, such as a gas, liquid or combination thereof, between a first member and a second member. Such fluids may include, for example, gases such as air, nitrogen, argon, acetylene gas, ammonia gas, blast furnace gas, chlorine gas, coke oven gas, cyanogen gas, hydrogen chloride gas, hydrogen gas, mercury vapors, nitric acid vapors, oxygen, ozone, and other gases too numerous to mention. Examples of liquids include nearly all chemical reagents such as inorganic and organic acids, alkalis, ketones, esters, aldehydes, alcohols, fuels, steam and hot water.

With few exceptions, such as perfluorinated fluids and alkali metals, perfluoroelastomers are generally resistant to virtually all chemicals. Perfluoroelastomeric seals may be used in harsh chemical environments, such as those encountered in the pumping of strong acids and other processing equipment in chemical plants and oil fields, for example. One of ordinary skill in the art would understand that the chemical resistance of perfluoroelastomeric compositions and articles to many other fluids, both in liquid and gaseous form, present at a wide range of temperatures may be improved by the process and method of the present invention.

A perfluoroelastomer is defined herein as an amorphous polymer of one or more perfluorinated monomers being substantially free of hydrogen substituents. A preferred perfluoroelastomer for use in the compositions, seals and methods of the present invention is a terpolymer of tetrafluoroethylene, perfluoroalkyl vinyl ether and one of several perfluorinated cure site monomers. The cure site monomer incorporates a functional group which permits crosslinking of the terpolymer. Preferred perfluoroelastomers are capable of maintaining their structural integrity at temperatures ranging from about −20° F. to about 450° F.

A preferred perfluoroelastomer is CHEMRAZ®, which is commercially available from Greene, Tweed & Co., Inc. of Kulpsville, Pa. Other preferred perfluoroelastomers which are similar in chemical composition to CHEMRAZ ® include KALREZ ®, which is commercially available from E. I. du Pont de Nemours of Wilmington, Del.; SIMRIZ ®, which is available from Freudenberg of Germany and DAIEL-PERFLUOR ®, which is available from Daikin Industries, Ltd. of Osaka, Japan.

Prior art seals made from elastomeric materials, even fluoroelastomeric materials, are vulnerable to attack from agents such as methyl ethyl ketone (MEK), diethylamine, aqueous ammonia, glacial acetic acid, methyl acrylate, tetrahydrofuran, toluene, and methyl alcohol. In contrast, perfluoroelastomers are impervious to attack by these and many other reagents under standard chemical processing conditions. Thus, the use of a perfluoroelastomeric composition allows seals to be used in hostile environments over prolonged periods of time and under conditions not previously allowable with seals of the prior art.

It is desirable to have a perfluoroelastomeric seal wherein the chemical resistance, compression set, sealing force retention, resilience and coefficients of friction are improved over a seal formed only from a perfluoroelastomer. In order to improve upon these and other properties, according to the present invention a perfluoroelastomer is mixed with a non-fibrillating fluorocarbon particulate polymer to form an elastomeric composition which is processed at a temperature less than the melting temperature of the non-fibrillating fluorocarbon particulate polymer to maintain the fluorocarbon polymer in particulate form, but substantially uniformly blended in the elastomeric composition. The elastomeric compositions and seals formed according to the present invention exhibit less die swell and resist fibrillation and provide improved chemical resistance over typical prior art perfluoroelastomeric compositions using conventional fillers.

The non-fibrillating fluorocarbon particulate polymer may be any fluorocarbon polymer which remains in particulate form and does not fibrillate under typical processing conditions and may, for example, be any of the following: (1) a low molecular weight (i.e., about 50,000 to about 500,000 molecular weight) polytetrafluoroethylene (PTFE) homopolymer, such as TEFLON ® MP 1100, which is commercially available from du Pont, (2) a copolymer of TFE and at least one of (a) hexafluoropropylene, such as TEFLON ® PA or TEFLON ® FEP, each of which is commercially available from du Pont and (b) a perfluoroalkyl vinyl ether, such as TEFLON ® PFA, which is also commercially available from du Pont, or perfluoromethyl vinyl ether, which is commercially available from Peninsular Chemical Research of Florida; and (3) fluorinated graphite.

Fluorinated graphite may be prepared by heating graphite in the presence of fluorine gas. The fluorine gas chemically combines with the graphite to produce a material with a composition of $(CF_x)_n$, where x ranges from about 0.25 to about 1.20 and n is at least about $10^3$.

As presently preferred, the fluorocarbon polymer is a mixture of (1) a copolymer of TFE and at least one of HFP or perfluoroalkyl vinyl ether and/or (2) fluorinated graphite in which x is about 0.9 to about 1.0.

The fluorocarbon polymer comprises up to about 30 wt % of the elastomeric composition and, more preferably, between about 5 and about 15 wt % of the elastomeric composition. The fluorocarbon polymer generally has an average particle diameter of about 1 to about 50 microns. One of ordinary skill in the art would understand that the selection of a fluorocarbon polymer having a suitable average particle diameter will depend upon such variables as the particular fluorocarbon polymer selected and processing conditions, such as temperature and pressure.

The elastomeric composition may also include one or more additives, such as carbon black, clay, silicon dioxide, barium sulfate, silica, polymeric fibers, curatives and/or plasticizers. An example of a plasticizer useful in the present elastomer composition is a perfluorinated alkyl ether, such as KRYTOX ®, which is commercially available from du Pont, or DEMNUM ®, which is commercially available from Daikin.

The elastomeric composition is produced by mixing or blending the perfluoroelastomer with one or more non-fibrillating fluorocarbon particulate polymer(s) and any desired additives. For example, the perfluoroelastomer, fluorocarbon polymer(s) and any additives desired may be blended using an internal mixer such as those commercially available from C. W. Brabender Instruments, Inc. of S. Hackensack, N.J. or other internal mixers such as are commercially available from Morijama of Farmingdale, N.Y. The fluorocarbon particulate polymer, however, must be mixed with the perfluoroelastomer at a temperature less than the melting temperature of the fluorocarbon particulate polymer to maintain its particulate form, prevent premature cross-linking of the perfluoroelastomer and maintain adequate flow properties.

Once all other ingredients desired are blended, curing agents are added to the blend. An example of a suitable curing agent is a combination of an organic peroxide, such as 2,5-dimethyl-2,5-di(t-butylperoxy)-hexane, and a coupling agent, such as triallyl isocyanurate.

The elastomeric composition is processed at a temperature less than the melting temperature of the non-fibrillating fluorocarbon particulate polymer to disperse the fluorocarbon polymer throughout the elastomeric composition while maintaining the fluorocarbon polymer in particulate form. For example, the melting temperature of TEFLON ® PA is about 180° C.–250° C., therefore the temperature at which an elastomeric composition containing this fluorocarbon polymer is processed should be less than about 180° C. to prevent melting of the fluorocarbon polymer.

Seals may then be formed from the elastomeric composition by a variety of processing methods, such as compression molding, injection molding, extrusion, etc. The processing methods before curing should also be conducted at temperatures less than the melting temperature of the fluorocarbon polymer, preferably less than about 180° C. The seals formed according to the present method have improved resistance to chemical attack when compared to seals made from a perfluoroelastomer alone. Also, the surface of a seal made according to the present method has lower coefficients of friction than conventional seals which include typical prior art fillers, such as carbon black.

Non-limiting examples of elastomer compositions and seals prepared according to the methods of the present invention are set forth in Examples 1–3 below.

EXAMPLE 1

Elastomeric compositions were prepared according to the process of the present invention by blending, at a temperature of about 140°–160° C., 100 parts of the perfluoroelastomer CHEMRAZ® with varying amounts of TEFLON® PA, TEFLON® FEP, MP 1100, and fluorographite which is commercially available from Ozark Mahoning of Oklahoma having a value of x ranging from about 0.9 to about 1.0. Sample 6 is a control sample filled with 14 parts of carbon black. The curing agent used for each sample was 2,5-dimethyl-2,5-di(t-butylperoxy)-hexane and the coupling agent was triallyl isocyanurate. The amounts of fluorocarbon polymers added to each of samples 1-5 are set forth in Table I.

The compositions were mixed in an internal mixer, extruded to form a preform, and compression molded according to standard industry practice at temperatures less than the melting temperature of the fluorocarbon particulate polymer component to form #214 O-rings. Each O-ring was press cured for 6 minutes at about 320° F. (160° C.) and subsequently post-cured for four hours at about 356° F. (180° C.) in a nitrogen atmosphere. Various physical tests, such as tensile strength, percent elongation, 100% and 50% modulus (each of the aforementioned tests being conducted according to ASTM D-1414), Durometer "M", specific gravity and compression set (ASTM method D-1414, #214 O-ring), were conducted on each sample, the results of which are set forth in Table I.

The compression set, or permanent deformation in compression, refers to the propensity of an elastomeric material to remain distorted and not return to its original shape after a deforming compressive load has been removed. The compression set value is expressed as a percentage of the original deflection that the material fails to recover. For example, a compression set value of 0% indicates that the material completely returns to its original shape. Conversely, a compression set value of 100% indicates that the material does not recover at all from the applied deformation. A compression set value of 30% signifies that 70% of the original deflection has been recovered. Higher compression set values generally correspond to higher seal leakage rates. The amount of seal leakage depends upon a variety of factors, such as the degree of seal deformation, system pressure, fluid viscosity and temperature extremes.

A solid O-ring formed from the perfluoroelastomer CHEMRAZ® and 14 parts of carbon black has a compression set of 30% over about 70 hours at about 400° F. (ASTM method D-1414, #214 O-ring). The compression set of the O-ring of Sample 1, which contains 12 parts of TEFLON® PA blended with 100 parts of the perfluoroelastomer CHEMRAZ®, is only 26%. Seals formed according to the method of the present invention typically have compression set values comparable to or less than those of the perfluoroelastomer CHEMRAZ® with a typical prior art inert filler.

As shown in Table I, the 100% and 50% modulus values and Durometer "M" (Duro "M") values for Sample Nos. 1-5, which contain various fluorocarbon fillers of the present invention, are comparable to those of Sample No. 6, which contains carbon black.

The O-rings of Samples 1-6 were subjected to immersion tests according to ASTM-D 471 for 70 hours at room temperature using harsh chemical agents. Table II presents the results of immersion testing of sample O-rings in an

TABLE I

| SAMPLE NO. | PARTS PER 100 PARTS PERFLUOROELASTOMER | | | | | TENSILE STRENGTH (p.s.i.) |
|---|---|---|---|---|---|---|
| | CARBON BLACK | TEFLON® PA | TEFLON® FEP | FLUORO-GRAPHITE | MP 1100 | |
| 1 | — | 12 | — | — | — | 1100 |
| 2 | — | — | 12 | — | — | 1000 |
| 3 | — | 6 | — | 6 | — | 1100 |
| 4 | — | — | 6 | 6 | — | 1100 |
| 5 | — | — | — | 6 | 6 | 1050 |
| 6 CONTROL | 14 | — | — | — | — | 1400 |

| SAMPLE NO. | PERCENTAGE ELONGATION | 100% MODULUS | 50% MODULUS | DURO "M" | SPECIFIC GRAVITY | PERCENTAGE COMPRESSION SET |
|---|---|---|---|---|---|---|
| 1 | 135 | 700 | 350 | 70 | 1.987 | 26 |
| 2 | 125 | 700 | 300 | 69 | 1.975 | 36 |
| 3 | 115 | 900 | 350 | 71 | 1.981 | 34 |
| 4 | 110 | 1000 | 400 | 71 | 1.989 | 32 |
| 5 | 120 | 850 | 350 | 71 | 1.991 | 34 |
| 6 CONTROL | 120 | 1050 | 400 | 71 | 1.950 | 30 |

TABLE II

| SAMPLE NO. | SAMPLES IMMERSED IN 93% SULFURIC ACID | | | | | |
|---|---|---|---|---|---|---|
| | TENSILE STRENGTH (p.s.i.) | PERCENT CHANGE IN TENSILE STRENGTH | PERCENTAGE ELONGATION | PERCENT CHANGE IN ELONGATION | CHANGE IN DURO "M" | PERCENT CHANGE IN VOLUME |
| 1 | 1250 | +14 | 150 | +11 | −1 | +0.09 |
| 2 | 1400 | +40 | 155 | +24 | −1 | +0.12 |
| 3 | 1500 | +27 | 155 | +35 | 0 | +0.07 |
| 4 | 1500 | +27 | 145 | +32 | 0 | −0.04 |
| 5 | 1250 | +19 | 125 | +4 | 0 | +0.04 |
| 6 CONTROL | 1200 | −14 | 105 | −13 | −2 | +0.91 |

TABLE III

| | SAMPLES IMMERSED IN FUMING NITRIC ACID | | | | | |
|---|---|---|---|---|---|---|
| SAMPLE NO. | TENSILE STRENGTH (p.s.i.) | PERCENT CHANGE IN TENSILE STRENGTH | PERCENTAGE ELONGATION | PERCENT CHANGE IN ELONGATION | CHANGE IN DURO "M" | PERCENT CHANGE IN VOLUME |
| 1 | 1300 | +18 | 155 | +15 | −1 | +1.49 |
| 2 | 1400 | +40 | 160 | +28 | −1 | +1.49 |
| 3 | 1350 | +23 | 145 | +26 | 0 | +1.32 |
| 4 | 1250 | +14 | 135 | +23 | 0 | +1.32 |
| 5 | 1100 | 5 | 120 | 0 | −2 | +1.41 |
| 6 CONTROL | 1050 | −25 | 95 | −21 | 0 | +5.33 |

TABLE IV

| | SAMPLES IMMERSED IN PERFLUOROTRIBUTYLAMINE | | | | | |
|---|---|---|---|---|---|---|
| SAMPLE NO. | TENSILE STRENGTH (p.s.i.) | PERCENT CHANGE IN TENSILE STRENGTH | PERCENTAGE ELONGATION | PERCENT CHANGE IN ELONGATION | CHANGE IN DURO "M" | PERCENT CHANGE IN VOLUME |
| 1 | 450 | −59 | 105 | −22 | −10 | +54.20 |
| 2 | 400 | −60 | 100 | −20 | −9 | +54.83 |
| 3 | 500 | −55 | 90 | −22 | −13 | +49.99 |
| 4 | 650 | −41 | 110 | 0 | −10 | +48.20 |
| 5 | 500 | −52 | 100 | −17 | −11 | +50.96 |
| 6 CONTROL | 400 | −71 | 60 | −50 | −6 | +43.80 | aqueous solution of 93% sulfuric acid. Table III presents the results of immersion testing of sample O-rings in fuming nitric acid. Table IV presents the results of immersion testing of sample O-rings in perfluorotributylamine. Samples 1–5 are filled with various combinations of fluorocarbon particulate polymers, while Sample 6 is a control sample filled with carbon black.

As shown in Tables II, III and IV, the control (Sample 6) containing carbon black filler is more seriously affected by these harsh chemicals in relation to tensile according to the present invention have improved chemical resistance over perfluoroelastomers containing conventional fillers, such as carbon black.

EXAMPLE 2

Elastomer compositions were prepared according to the process of the present invention by blending, at a temperature of about 140°–160° C., 100 parts of the perfluoroelastomer CHEMRAZ® with varying amounts of TEFLON® PA, silica (R-972, which is commercially available from Degussa Corporation of Chester, Pa.), fluorographite having a value of x ranging from about 0.9 to about 1.0 (which is commercially available from Ozark Mahoning) and titanium dioxide (which is commercially available from du Pont) (Samples A–C). Sample D is a control sample filled with 14 parts of carbon black. The curing agent used for each sample was 2,5-dimethyl-2,5-di(t-butylperoxy)-hexane and the coupling agent was triallyl isocyanurate. The amounts of fluorocarbon polymers and other fillers added to each of samples A–C are set forth in Table V.

The compositions were mixed and compression molded according to standard industry practice in the same manner as that set forth in Example 1 above to form #214 O-rings. Each O-ring was press cured and subsequently post-cured for four hours in the same manner as that set forth in Example 1 above. Various physical tests were conducted on each sample, the results of which are set forth in Table V.

TABLE V

| | PARTS PER 100 PARTS PERFLUOROELASTOMER | | | | | TENSILE |
|---|---|---|---|---|---|---|
| SAMPLE | CARBON BLACK | TEFLON ® PA | SILICA | FLUORO-GRAPHITE | TITANIUM DIOXIDE | STRENGTH (p.s.i.) |
| A | — | 6 | 3 | 6 | 1 | 1360 |
| B | — | 5 | 2 | 5 | — | 1350 |
| C | — | 10 | 5 | — | — | 1230 |
| D | 14 | — | — | — | — | 1500 |

| SAMPLE | PERCENTAGE ELONGATION | 100% MODULUS | 50% MODULUS | DURO "M" | SPECIFIC GRAVITY |
|---|---|---|---|---|---|
| A | 190 | 560 | 150 | 70 | 1.957 |
| B | 170 | 680 | 180 | 70 | 1.930 |
| C | 180 | 450 | 140 | 70 | 1.946 |
| D | 140 | 790 | 210 | 75 | 1.904 |

TABLE VI

SAMPLES IMMERSED IN STEAM (30 DAYS)

| SAMPLE NO. | TENSILE STRENGTH (p.s.i.) | PERCENT CHANGE IN TENSILE STRENGTH | PERCENTAGE ELONGATION | PERCENT CHANGE IN ELONGATION | DURO "M" | CHANGE IN DURO "M" | PERCENT CHANGE IN VOLUME |
|---|---|---|---|---|---|---|---|
| A | 1400 | +3 | 165 | −13 | 69 | −1 | +0.4 |
| B | 1430 | +6 | 145 | −15 | 71 | +2 | +0.6 |
| C | 1230 | 0 | 165 | −9 | 72 | +3 | +0.7 |
| D | 1640 | +9 | 120 | −15 | 78 | +4 | +0.6 |

TABLE VII

SAMPLES IMMERSED IN HYDRAZINE (30 DAYS)

| SAMPLE NO. | TENSILE STRENGTH (p.s.i.) | PERCENT CHANGE IN TENSILE STRENGTH | PERCENTAGE ELONGATION | PERCENT CHANGE IN ELONGATION | DURO "M" | CHANGE IN DURO "M" | PERCENT CHANGE IN VOLUME |
|---|---|---|---|---|---|---|---|
| A | 1350 | −1 | 160 | −16 | 69 | −1 | +0.2 |
| B | 1400 | +4 | 155 | −9 | 71 | +2 | +0.4 |
| C | 1270 | +3 | 165 | −8 | 72 | +3 | +0.8 |
| D | 1700 | +13 | 125 | −11 | 79 | +5 | 0 |

TABLE VIII

SAMPLE IMMERSED IN N-METHYLPYRROLIDONE (30 DAYS)

| SAMPLE NO. | TENSILE STRENGTH (p.s.i.) | PERCENT CHANGE IN TENSILE STRENGTH | PERCENTAGE ELONGATION | PERCENT CHANGE IN ELONGATION | DURO "M" | CHANGE IN DURO "M" | PERCENT CHANGE IN VOLUME |
|---|---|---|---|---|---|---|---|
| A | 1240 | −9 | 150 | −21 | 69 | −1 | 0 |
| B | 1240 | −8 | 135 | −21 | 71 | +2 | +0.7 |
| C | 1290 | +5 | 175 | −3 | 72 | +3 | +0.3 |
| D | 1640 | +9 | 125 | −11 | 78 | +4 | +0.5 |

The O-rings of Samples A–D were subjected to immersion tests according to ASTM-D 471 for 30 days using harsh chemical agents. The immersion tests using hydrazine and n-methylpyrrolidone were conducted at room temperature. Table VI presents the results of immersion testing of sample O-rings in steam. Table VII presents the results of immersion testing of sample O-rings in hydrazine. Table VIII presents the results of immersion testing of sample O-rings in n-methylpyrrolidone.

As shown in Tables VI, VII and VIII, the control (Sample D) is generally more seriously affected by these harsh chemicals in relation to tensile strength, elongation, volume swell, and hardness than any of the samples filled with the fluorocarbon particulate polymers. Therefore, perfluoroelastomeric compositions and articles formed according to the present invention have improved chemical resistance over perfluoroelastomers containing conventional fillers, such as carbon black.

EXAMPLE 3

Elastomeric compositions were prepared according to the process of the present invention by blending, at a temperature of about 140°–160° C., 100 parts of the perfluoroelastomer CHEMRAZ® with varying amounts of TEFLON® PA and fluorographite having a value of x ranging from about 0.9 to about 1.0 (which is commercially available from Ozark Mahoning). The amounts of fluorocarbon polymers added to each of these samples BB and CC are set forth in Table IX.

The compositions of the present invention were mixed and compression molded according to standard industry practice in the same manner as that set forth in Example 1 above to form #214 O-rings. Each O-ring was press cured and subsequently post-cured for four hours in the same manner as that set forth in Example 1 above. These O-rings were compared with a commercially available O-ring (Sample AA) formed from Kalrez® (No. 4079) which was obtained from du Pont.

TABLE IX

| SAMPLE NO. | PERFLUORO-ELASTOMER | PARTS PER 100 PARTS PERFLUORO-ELASTOMER | | FRICTION FORCE LBS AT 0 p.s.i. | | | |
|---|---|---|---|---|---|---|---|
| | | TEFLON PA® | FLUORO-GRAPHITE | DYNAMIC | | BREAK-AWAY | |
| | | | | WET | DRY | WET | DRY |
| AA | KALREZ® | — | — | 4.3 | 6.2 | 17.8 | 38.4 |
| BB | CHEMRAZ® | 5 | 5 | 3.7 | 5.5 | 16.2 | 34.6 |
| CC | CHEMRAZ® | 6 | 6 | 3.1 | 4.3 | 14/6 | 28.9 |

Each O-ring was tested to determine its breakaway and dynamic friction values, i.e., frictional drag, under wet and dry conditions. Seals having lower breakaway and dynamic friction values are desirable because they generally wear more slowly and last longer in service than seals having higher breakaway and dynamic friction values.

Each O-ring was tested using the friction apparatus, indicated generally at 10, shown in FIG. 1. For dry friction testing, each seal was installed in a clean standard gland, indicated generally at 12, without any type of lubrication during either installation or testing. FIG. 2 is an enlarged detailed cross-sectional view of a portion of FIG. 1 showing the seal 14 positioned between the rod 16 and gland 12 for testing of the seal. The rod 16 of the apparatus 10 was hard chrome having a 0.998 inch diameter and 8–12 $R_a$ finish. The gland had a diameter of 1.242 inches and a length of 0.170 inches.

The test pressure was 0 p.s.i. The rod was cycled for 30 cycles per test at a velocity of 6 in/sec and a stroke length of 6 inches. To determine the dynamic frictional force value for each O-ring, the rod was maintained under static conditions for 4 hours. For wet testing, both the rod and the gland were lubricated with Mil-H-5606 oil prior to testing. The wet testing was then conducted in the same manner as the dry testing set forth above.

The dynamic and breakaway frictional force values for each O-ring were recorded using a conventional force transducer and computerized data acquisition system, designated as "CRT" in FIG. 1. The dynamic and breakaway frictional force values for each O-ring are set forth in Table IX. Further details of the data recording system will be omitted because the details are not necessary for one of ordinary skill in the art to understand the present invention.

Figure 4:
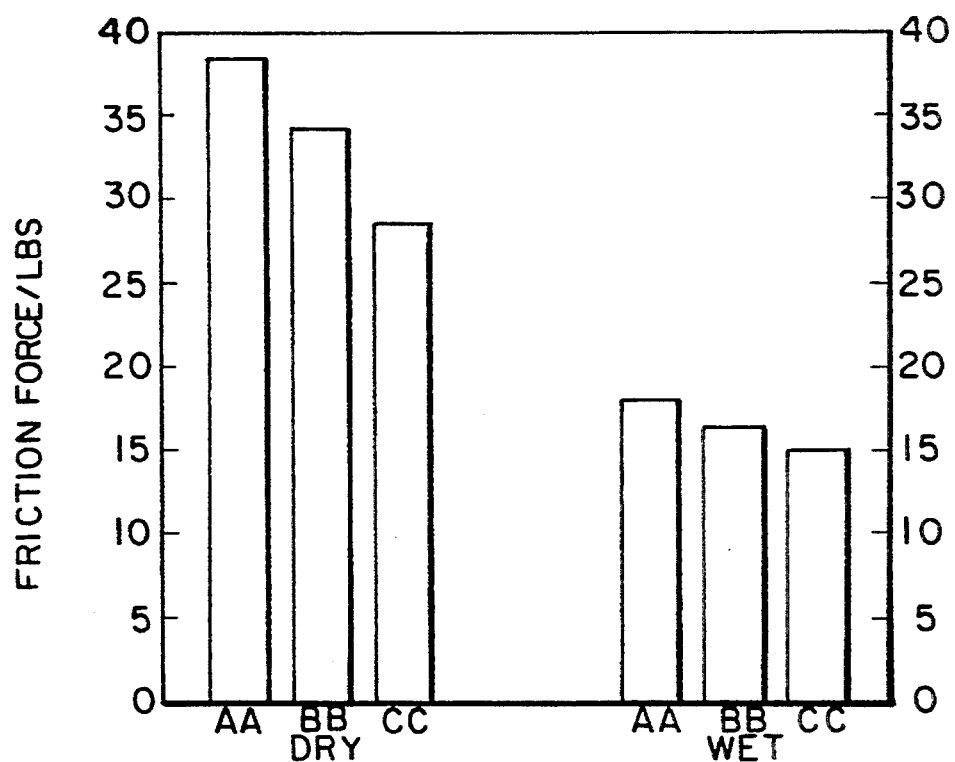
FIG. 4 is a graph of breakaway friction values of O-ring seals produced according to the method of the present invention.

As shown in Table IX and in FIG. 3, the dynamic frictional values under both wet and dry conditions for the O-rings of Samples BB and CC, each of which were prepared according to the method of the present invention, are lower than the dynamic frictional values for the Kalrez ® O-ring (Sample AA). Likewise, as shown in Table IX and in FIG. 4, the breakaway frictional values under both wet and dry conditions for the O-rings of Samples BB and CC, each of which were prepared according to the method of the present invention, are lower than the breakaway frictional values for the Kalrez ® O-ring (Sample AA). Therefore, both the dynamic and breakaway frictional values for O-rings formed according to the present method are less than the dynamic and breakaway frictional values for an O-ring formed from Kalrez ® without a non-fibrillating fluorocarbon particulate polymer and are therefore less subject to wear.

In many dynamic sealing applications, low torque startup, low running friction and reduced wear are important considerations when rating seal performance. The perfluoroelastomer products produced according to this invention provide these improvements as shown in Table V, detailing the coefficient of friction of compositions with and without these fillers.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An elastomeric composition having improved resistance to chemical attack, comprising a mixture of:
   a perfluoroelastomer and
   a particulate fluorinated graphite having a composition of $(CF_x)_n$ where x ranges from about 0.25 to about 1.20 and n is at least about $10^3$.

2. The elastomeric composition according to claim 1, wherein the perfluoroelastomer is a terpolymer of tetrafluoroethylene, a perfluoroalkyl vinyl ether and a perfluorinated cure site monomer which includes a functional group which permits crosslinking of the terpolymer.

3. The elastomeric composition according to claim 1, wherein the fluorinated graphite has an average particle diameter of about 1 to about 50 microns.

4. The elastomeric composition according to claim 1, wherein the fluorinated graphite comprises up to about 30 wt % of the elastomeric composition.

5. The elastomeric composition according to claim 4, wherein the fluorinated graphite comprises about 5 to about 15 wt % of the elastomeric composition.

6. The elastomeric composition according to claim 1, further comprising an additive selected from the group consisting of carbon black, clay, silicon dioxide, barium sulfate, silica, polymeric fibers, curatives and plasticizers.

7. The elastomeric composition according to claim 6, wherein the plasticizer is a perfluorinated alkyl polyether.

8. The elastomeric composition of claim 1, wherein the mixture further comprises a non-fibrillating particulate fluorocarbon polymer.

9. A process for improving the resistance to chemical attack and increasing the strength of a perfluoroelastomer, comprising:
   mixing the perfluoroelastomer with a non-fibrillating fluorocarbon particulate polymer and a particulate fluorinated graphite having a composition of $(CF_x)_n$ where x ranges from about 0.25 to about 1.20 and n is at least about $10^3$ to form an elastomeric composition; and
   processing the elastomeric composition at a processing temperature less than the melting temperature of the non-fibrillating fluorocarbon particulate polymer to disperse the fluorocarbon polymer and the fluorinated graphite throughout the perfluoroelastomer while maintaining the fluorocarbon polymer and fluorinated graphite in particulate form.

10. The process according to claim 9, wherein the perfluoroelastomer is a terpolymer of tetrafluorethylene, a perfluoralkyl vinyl ether and a perfluorinated cure site monomer which includes a functional group which permits crosslinking of the terpolymer.

11. The process according to claim 9, wherein the fluorinated graphite has an average particle diameter of about 1 to about 50 microns.

12. The process according to claim 9, wherein the fluorinated graphite comprises up to about 30 wt % of the elastomeric composition.

13. The process according to claim 9, wherein the fluorinated graphite comprises about 5 to about 15 wt % of the elastomeric composition.

14. The process according to claim 9, further comprising the step of mixing the elastomeric composition with an additive selected from the group consisting of carbon black, clay, silicon dioxide, barium sulfate, silica, polymeric fibers, curatives and plasticizers.

15. The process according to claim 14, wherein the plasticizer is a perfluorinated alkyl polyether.

16. The process according to claim 9, wherein the processing temperature is less than about 180° C.

17. The process according to claim 9, wherein the fluorocarbon polymer is selected from the group consisting of a low molecular weight polytetrafluoroethylene homopolymer and a copolymer of tetrafluoroethylene and at least one of hexafluoropropylene and perfluoroalkyl vinyl ether.

* * * * *